(12) United States Patent
Ichiroku

(10) Patent No.: US 10,704,008 B2
(45) Date of Patent: Jul. 7, 2020

(54) HEAT-CONDUCTIVE SILICONE GREASE COMPOSITION

(71) Applicant: SHIN-ETSU CHEMICAL CO., LTD., Tokyo (JP)

(72) Inventor: Nobuhiro Ichiroku, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 268 days.

(21) Appl. No.: 15/562,492

(22) PCT Filed: Apr. 6, 2016

(86) PCT No.: PCT/JP2016/061248
§ 371 (c)(1),
(2) Date: Sep. 28, 2017

(87) PCT Pub. No.: WO2016/175001
PCT Pub. Date: Nov. 3, 2016

(65) Prior Publication Data
US 2018/0094207 A1   Apr. 5, 2018

(30) Foreign Application Priority Data
Apr. 30, 2015   (JP) ................. 2015-092709

(51) Int. Cl.
| | | |
|---|---|---|
| *C10M 169/04* | (2006.01) | |
| *C08K 3/08* | (2006.01) | |
| *C08K 3/28* | (2006.01) | |
| *C08L 63/00* | (2006.01) | |
| *C08L 83/04* | (2006.01) | |
| *C09K 5/14* | (2006.01) | |
| *C10M 107/24* | (2006.01) | |
| *C10M 125/04* | (2006.01) | |

(Continued)

(52) U.S. Cl.
CPC ............ *C10M 169/04* (2013.01); *C08K 3/08* (2013.01); *C08K 3/28* (2013.01); *C08L 63/00* (2013.01); *C08L 83/04* (2013.01); *C09K 5/14* (2013.01); *C10M 107/24* (2013.01); *C10M 107/50* (2013.01); *C10M 125/04* (2013.01); *C10M 125/10* (2013.01); *C10M 125/20* (2013.01); *C10M 125/26* (2013.01); *C10M 169/02* (2013.01); *C10M 2201/05* (2013.01); *C10M 2201/061* (2013.01); *C10M 2201/062* (2013.01); *C10M 2201/105* (2013.01); *C10M 2209/1016* (2013.01); *C10M 2229/025* (2013.01); *C10M 2229/0415* (2013.01); *C10M 2229/0435* (2013.01); *C10M 2229/0465* (2013.01); *C10M 2229/0485* (2013.01); *C10N 2210/02* (2013.01); *C10N 2210/03* (2013.01); *C10N 2210/04* (2013.01); *C10N 2210/08* (2013.01); *C10N 2220/022* (2013.01); *C10N 2220/082* (2013.01); *C10N 2230/02* (2013.01); *C10N 2230/08* (2013.01); *C10N 2250/10* (2013.01)

(58) Field of Classification Search
CPC ......................... C10M 169/04; C10M 107/24; C10M 107/50; C10M 125/04; C10M 125/10; C10M 125/20; C10M 125/26; C10M 169/02; C10M 2201/05; C10M 2201/061; C10M 2201/062; C10M 2209/1016; C10M 2229/025; C10M 2229/0415; C10M 2229/0435; C10M 2229/0465; C10M 2229/0485; C08K 3/08; C08K 3/22; C08K 3/28; C08L 63/00; C08L 83/04; C09K 5/14; C10N 2210/02; C10N 2210/03; C10N 2210/04; C10N 2210/08; C10N 2220/022; C10N 2220/082; C10N 2230/02; C10N 2230/08; C10N 2250/10
USPC ........................................................ 524/432
See application file for complete search history.

(56) References Cited

U.S. PATENT DOCUMENTS

| | | |
|---|---|---|
| 6,114,429 A | 9/2000 | Yamada et al. |
| 6,372,337 B2 | 4/2002 | Takahashi et al. |

(Continued)

FOREIGN PATENT DOCUMENTS

| | | |
|---|---|---|
| EP | 0 939 115 A1 | 9/1999 |
| EP | 2 966 106 A1 | 1/2016 |

(Continued)

OTHER PUBLICATIONS

Office Action dated Jun. 17, 2019, in Taiwan Patent Application No. 105113539.

(Continued)

*Primary Examiner* — Ling Siu Choi
*Assistant Examiner* — Ronald Grinsted
(74) *Attorney, Agent, or Firm* — Birch, Stewart, Kolasch & Birch, LLP

(57) ABSTRACT

A heat-conductive silicone grease composition comprising (A) an organopolysiloxane in an amount of 20 to 90 parts by mass, (B) a non-silicone-type organic compound in an amount of 80 to 10 parts by mass (wherein the total amount of the components (A) and (B) is 100 parts by mass) and (C) a heat-conductive inorganic filler having an average particle diameter of 0.5 to 100 μm in an amount of 200 to 2,000 parts by mass relative to 100 parts by mass of the total amount of the components (A) and (B), wherein the SP value of the non-silicone-type organic compound (B) is greater than that of the organopolysiloxane (A) (i.e., (B)>(A)), the value obtained by subtracting the SP value of the component (A) from the SP value of the component (B) is greater than 2, and the viscosity of the heat-conductive silicone grease composition is 50 to 1,000 Pa·s at 25° C.

6 Claims, No Drawings

(51) Int. Cl.
*C10M 125/10* (2006.01)
*C10M 125/20* (2006.01)
*C10M 125/26* (2006.01)
*C10M 169/02* (2006.01)
*C10M 107/50* (2006.01)

(56) References Cited

U.S. PATENT DOCUMENTS

| | | | |
|---|---|---|---|
| 6,410,123 B1 | 6/2002 | Otani et al. | |
| 2011/0163460 A1 | 7/2011 | Kato et al. | |
| 2012/0280169 A1* | 11/2012 | Kato | C10M 169/00 252/75 |
| 2012/0281069 A1 | 11/2012 | Kato et al. | |
| 2016/0122604 A1* | 5/2016 | Yoshimoto | C08G 59/32 252/74 |

FOREIGN PATENT DOCUMENTS

| | | |
|---|---|---|
| JP | 11-49958 A | 2/1999 |
| JP | 11-246884 A | 9/1999 |
| JP | 2000-63873 A | 2/2000 |
| JP | 2000-169873 A | 6/2000 |
| JP | 2003-301184 A | 10/2003 |
| JP | 2009-96961 A | 5/2009 |
| JP | 2010-59237 A | 3/2010 |
| JP | 2010-100665 A | 5/2010 |
| JP | 2011-140566 A | 7/2011 |
| TW | 201012876 A1 | 4/2010 |
| TW | 201134879 A1 | 10/2011 |
| WO | WO 2010/024305 A1 | 3/2010 |
| WO | WO 2011/083880 A1 | 7/2011 |
| WO | WO 2013/077351 A1 | 5/2013 |
| WO | WO 2014/136773 A1 | 9/2014 |
| WO | WO-2014136773 A1 * | 9/2014 ............. C08G 59/32 |

OTHER PUBLICATIONS

International Search Report, issued in PCT/JP2016/061248, dated May 10, 2016.

Written Opinion of the International Searching Authority, issued in PCT/JP2016/061248, dated May 10, 2016.

* cited by examiner

HEAT-CONDUCTIVE SILICONE GREASE COMPOSITION

TECHNICAL FIELD

The present invention relates to a thermally conductive silicone grease composition, and more particularly to a thermally conductive silicone grease composition having a low viscosity and excellent thermal conductivity.

BACKGROUND ART

Because electrical and electronic components generate heat during use, heat removal is generally necessary in order to allow these components to operate properly. Various types of thermally conductive materials used for such heat removal have hitherto been described. Thermally conductive materials for such cases exist in two forms: (1) sheet-like materials that are easy to handle, and (2) paste-like materials which are called thermal greases.

Of these, the sheet-like materials (1) are not only easy to handle, they also have an excellent stability. On the other hand, because the contact thermal resistance inevitably increases, the heat-releasing performance is inferior to that of thermal greases. Moreover, because such materials must have a certain degree of strength and rigidity in order to maintain the form of a sheet, they are unable to absorb the tolerances that arise between a component and its housing; hence the component is sometimes destroyed by stresses thereon.

By contrast, thermal greases (2) are not only adaptable to the mass production of electrical and electronic components through the use of dispensing or printing devices, because of their low contact thermal resistance, they also have an excellent heat-releasing performance. However, when the viscosity of the thermal grease is lowered so as to obtain a good dispensing or printing performance, this limits the content of thermally conductive inorganic filler, making it impossible to ensure sufficient thermal conductivity. Hence, heat removal becomes inadequate, as a result of which component malfunction may arise.

This situation has led to the disclosure of even higher performance thermally conductive silicone grease compositions, such as grease-type silicone compositions that combine a specific organopolysiloxane, a thickener such as zinc oxide, alumina, aluminum nitride, boron nitride or silicon carbide, an organopolysiloxane having at least one silicon-bonded hydroxyl group per molecule and an alkoxysilane, thereby suppressing bleeding of the base oil (Patent Document 1); thermally conductive silicone compositions of excellent thermal conductivity and dispensing ability which are obtained by combining a liquid silicone with a thermally conductive inorganic filler having a given thermal conductivity and a Mohs hardness of 6 or more, and a thermally conductive inorganic filler having a given thermal conductivity and a Mohs hardness of 5 or less (Patent Document 2); thermally conductive grease compositions obtained by combining a specific base oil with a metallic aluminum powder having an average particle size of from 0.5 to 50 μm (Patent Document 3); silicone grease compositions in which the loading of aluminum nitride within the silicone grease has been increased by using in admixture two types of aluminum nitride powders of differing average particles sizes (Patent Document 4); and silicone grease compositions that suppress bleedout by increasing the oil viscosity (Patent Document 5). However, thermally conductive silicone grease compositions that can be fully adapted to the increasing performance of electronic and electrical components in use have yet to be achieved.

PRIOR ART DOCUMENTS

Patent Documents

Patent Document 1: JP-A H11-49958
Patent Document 2: JP-A H11-246884
Patent Document 3: JP-A 2000-63873
Patent Document 4: JP-A 2000-169873
Patent Document 5: JP-A 2003-301184

SUMMARY OF THE INVENTION

Problems to be Solved by the Invention

It is therefore an object of the present invention to provide a thermally conductive silicone grease composition that has a low viscosity and excellent heat conductivity.

Means for Solving the Problems

The inventor, having conducted extensive investigations aimed at achieving the above object, has discovered as a result that silicone grease compositions having a low viscosity and high thermal conductivity can be obtained by combining a specific organopolysiloxane, a non-silicone type organic compound having a solubility parameter higher than that of the organopolysiloxane, and a thermally conductive inorganic filler.

Accordingly, the invention provides the following highly thermally conductive silicone grease composition.

[1] A thermally conductive silicone grease composition containing:

(A) from 20 to 90 parts by weight of an organopolysiloxane, (B) from 80 to 10 parts by weight of a non-silicone type organic compound, the combined amount of components (A) and (B) being 100 parts by weight, and (C) a thermally conductive inorganic filler having an average particle size of from 0.5 to 100 μm, in an amount of from 200 to 2,000 parts by weight per 100 parts by weight of components (A) and (B) combined, wherein the non-silicone type organic compound (B) and the organopolysiloxane (A) have respective solubility parameters (SP) such that the SP of component (B)> the SP of component (A), and
the SP of component (B)– the SP of component (A)>2;

and the thermally conductive silicone grease composition has a viscosity at 25° C. of from 50 to 1,000 Pa·s.

[2] The thermally conductive silicone grease composition of [1], wherein the organopolysiloxane (A) is a hydrolyzable organopolysiloxane of general formula (1) below which has a viscosity at 25° C. of from 0.005 to 100 mPa·s

[Chemical Formula 1]

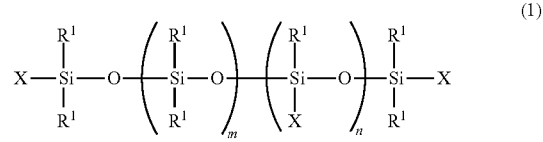

wherein each $R^1$ is a like or unlike monovalent hydrocarbon group, X is $R^1$ or a group of the formula $-R^2-SiR^1_{(3-a)}(OR^3)_a$ wherein $R^1$ being as defined above; $R^2$ being an oxygen atom or an alkylene group of 1 to 4 carbon atoms; $R^3$ being an alkyl, alkoxyalkyl, alkenyl or acyl group of 1 to 4 carbon atoms; and the letter "a" being an integer from 1 to 3, and m and n respectively satisfy the conditions $1 \leq m \leq 1,000$ and $0 \leq n \leq 1,000$;

the non-silicone type organic compound (B) is a compound with a solubility parameter of 10 or more which has on the molecule an organic group selected from among epoxy, phenolic hydroxyl and amino groups; and the thermally conductive inorganic filler (C) is of at least one type selected from the group consisting of metallic powders, metal oxide powders, metal hydroxide powders and metal nitride powders.

[3] The thermally conductive silicone grease composition of [2], wherein the organopolysiloxane (A) is a hydrolyzable organopolysiloxane having three or six $OR^3$ groups (wherein $R^3$ is as defined above).

[4] The thermally conductive silicone grease composition of [2] or [3], wherein the non-silicone type organic compound (B) is an aromatic liquid compound with a functionality of 3 or less that has on the molecule an organic group selected from among epoxy, phenolic hydroxyl and amino groups.

[5] The thermally conductive silicone grease composition of [4], wherein the non-silicone type organic compound (B) is an aromatic liquid epoxy resin having a functionality of 3 or less.

[6] The thermally conductive silicone grease composition of any one of [1] to [5], wherein the thermally conductive inorganic filler (C) is one or a combination of two or more selected from the group consisting of aluminum, silver, copper, nickel, zinc oxide, aluminum oxide, silicon oxide, magnesium oxide, aluminum nitride, boron nitride, silicon nitride and metallic silicon.

Advantageous Effects of the Invention

The thermally conductive silicone grease composition of the invention has a low viscosity and thus an excellent dispensing ability and printability. Moreover, because it has an excellent thermal conductivity, it is suitable for removing heat from electrical and electronic components that generate heat during use.

EMBODIMENT FOR CARRYING OUT THE INVENTION

The organopolysiloxane serving as component (A) in the thermally conducting silicone grease composition of the invention has a viscosity at 25° C., as measured with a Brookfield rotational viscometer, that is preferably in the range of 0.005 to 100 mPa·s, and more preferably in the range of 0.005 to 50 mPa·s. When the viscosity at 25° C. is lower than 0.005 mPa·s, undesirable effects such as separation arise during storage of the resulting silicone grease composition, resulting in a poor stability. At a viscosity greater than 100 mPa·s, mixture with component (B) may be difficult.

The organopolysiloxane serving as component (A) preferably includes a hydrolyzable organopolysiloxane of general formula (1) below.

[Chemical Formula 2]

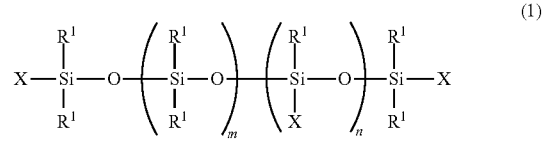

(1)

In this formula, each $R^1$ is a like or unlike monovalent hydrocarbon group, each X is independently $R^1$ or a group of the formula $-R^2-SiR^1_{(3-a)}(OR^3)_a$ wherein $R^1$ being as defined above; $R^2$ being an oxygen atom or an alkylene group of 1 to 4 carbon atoms; $R^3$ being an alkyl, alkoxyalkyl, alkenyl or acyl group of 1 to 4 carbon atoms; and the letter "a" being an integer from 1 to 3, and m and n respectively satisfy the conditions $1 \leq m \leq 1,000$ and $0 \leq n \leq 1,000$.

The organopolysiloxane (A) component used in the invention is more preferably one of general formula (2) below.

[Chemical Formula 3]

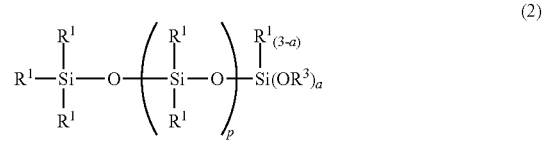

(2)

In this formula, each $R^1$ is independently a substituted or unsubstituted monovalent hydrocarbon group, each $R^3$ is independently an alkyl, alkoxyalkyl, alkenyl or acyl group; the letter "p" is an integer from 5 to 100, and the letter "a" is an integer from 1 to 3.

The organopolysiloxane (A) also has the role of maintaining the flowability of the composition and imparting a good handleability to the composition, even when the inventive composition contains a high loading of the thermally conductive inorganic filler as component (C) in order to obtain a highly thermally conductive silicone grease composition.

In above formulas (1) and (2), each $R^1$ is independently a substituted or unsubstituted monovalent hydrocarbon group of preferably 1 to 10, more preferably 1 to 6, and more preferably 1 to 3 carbon atoms, as exemplified by linear alkyl, branched alkyl, cyclic alkyl, alkenyl, aryl, aralkyl and halogenated alkyl groups. Examples of linear alkyl groups include methyl, ethyl, propyl, hexyl and octyl groups. Examples of branched alkyl groups include isopropyl, isobutyl, tert-butyl and 2-ethylhexyl groups. Examples of cyclic alkyl groups include cyclopentyl and cyclohexyl groups. Examples of alkenyl groups include vinyl and allyl groups. Examples of aryl groups include phenyl and tolyl groups. Examples of aralkyl groups include 2-phenylethyl and 2-methyl-2-phenylethyl groups. Examples of halogenated alkyl groups include 3,3,3-trifluoropropyl, 2-(nonafluorobutyl)ethyl and 2-(heptadecafluorooctyl)ethyl groups. $R^1$ is preferably a methyl, phenyl or vinyl group.

Each $R^3$ is independently an alkyl, alkoxyalkyl, alkenyl or acyl group. Exemplary alkyl groups include the same linear alkyl, branched alkyl and cyclic alkyl groups as mentioned above for $R^1$. Examples of alkoxyalkyl groups include methoxyethyl and methoxypropyl groups. Examples of acyl groups include acetyl and octanoyl groups. $R^3$ is preferably an alkyl group, with methyl and ethyl groups being especially preferred.

The subscripts n and m are as described above, with the sum n+m preferably being from 10 to 50. The subscript p is an integer from 5 to 100, and preferably from 10 to 50. The letter "a" is an integer from 1 to 3, and is preferably 3. The number of $OR^3$ groups on the molecule is preferably from 1 to 6, and especially either 3 or 6.

It is preferable for the organopolysiloxane (A) to have a viscosity at 25° C. of generally from 0.005 to 100 mPa·s, and especially from 0.005 to 50 mPa·s. At a viscosity lower than 0.005 mPa·s, oil bleeding readily arises from the resulting room temperature, moisture-curable thermally conductive silicone grease composition and the composition tends to drip down. On the other hand, at a viscosity higher than 100 mPa·s, the resulting thermally conductive silicone grease composition has a poor flowability, which may worsen the dispensing ability and printability.

Preferred examples of the organopolysiloxane (A) include those shown below.

[Chemical Formula 4]

$$H_3C-\underset{\underset{CH_3}{|}}{\overset{\overset{CH_3}{|}}{Si}}-O-\left(\underset{\underset{CH_3}{|}}{\overset{\overset{CH_3}{|}}{Si}}-O\right)_{9}\underset{\underset{OCH_3}{|}}{\overset{\overset{OCH_3}{|}}{Si}}-OCH_3$$

$$H_3C-\underset{\underset{CH_3}{|}}{\overset{\overset{CH_3}{|}}{Si}}-O-\left(\underset{\underset{CH_3}{|}}{\overset{\overset{CH_3}{|}}{Si}}-O\right)_{15}\underset{\underset{OCH_3}{|}}{\overset{\overset{OCH_3}{|}}{Si}}-OCH_3$$

$$H_3C-\underset{\underset{CH_3}{|}}{\overset{\overset{CH_3}{|}}{Si}}-O-\left(\underset{\underset{CH_3}{|}}{\overset{\overset{CH_3}{|}}{Si}}-O\right)_{30}\underset{\underset{OCH_3}{|}}{\overset{\overset{OCH_3}{|}}{Si}}-OCH_3$$

$$H_3C-\underset{\underset{CH_3}{|}}{\overset{\overset{CH_3}{|}}{Si}}-O-\left(\underset{\underset{CH_3}{|}}{\overset{\overset{CH_3}{|}}{Si}}-O\right)_{45}\underset{\underset{OCH_3}{|}}{\overset{\overset{OCH_3}{|}}{Si}}-OCH_3$$

$$H_2C\overset{H}{=}\underset{\underset{CH_3}{|}}{\overset{\overset{}{}}{C}}-\underset{\underset{CH_3}{|}}{\overset{\overset{}{}}{Si}}-O-\left(\underset{\underset{CH_3}{|}}{\overset{\overset{CH_3}{|}}{Si}}-O\right)_{30}\underset{\underset{OCH_3}{|}}{\overset{\overset{OCH_3}{|}}{Si}}-OCH_3$$

When the amount of this organopolysiloxane (A) per 100 parts by weight of components (A) and (B) combined is less than 20 parts by weight, the thermally conductive silicone composition thickens and becomes impossible to discharge; when it is more than 90 parts by weight, the viscosity becomes too low, resulting in bleeding of the organopolysiloxane (A). Therefore, the amount used is in the range of 20 to 90 parts by weight, and preferably in the range of 30 to 80 parts by weight.

The non-silicone type organic compound serving as component (B) is preferably an organic compound having on the molecule an organic group selected from among epoxy, phenolic hydroxyl and amino groups, more preferably an aromatic liquid compound having a functionality of 3 or less, and especially an aromatic liquid epoxy resin having a functionality of 3 or less.

Here, compounds having an epoxy group are exemplified by the following epoxy resins. Characteristics such as the molecular structure and molecular weight are limited to a viscosity for the compound at 25° C., as measured with a Brookfield rotational viscometer, of from 10 to 1,000,000 mPa·s. Illustrative examples of such epoxy compounds include diglycidyl ethers of bis(4-hydroxyphenyl)methane, 2,2'-bis(4-hydroxyphenyl)propane or halides thereof, and condensation polymers of these (e.g., what are referred to as phenol F type epoxy resins and bisphenol A type epoxy resins), butadiene diepoxide, vinylcyclohexene dioxide, the diglycidyl ether of resorcinol, 1,4-bis(2,3-epoxypropoxy) benzene, 4,4'-bis(2,3-epoxypropoxy)diphenyl ether, 1,4-bis (2,3-epoxypropoxy)cyclohexene, bis(3,4-epoxy-6-methylcyclohexylmethyl) adipate, 1,2-dioxybenzene or resorcinol, epoxy glycidyl ethers or polyglycidyl esters obtained by the condensation of a polyphenol or a polyhydric alcohol with epichlorohydrin, and epoxidized polyolefins, epoxidized polybutadiene, naphthalene ring-containing epoxy resins, biphenyl-type epoxy resins, phenolaralkyl-type epoxy resins, biphenylaralkyl-type epoxy resins and cyclopentadiene-type epoxy resins obtained by a peroxidation process.

A monoepoxy compounds may be suitably used together with the above epoxy resin. Illustrative examples of such monoepoxy compounds include styrene oxide, cyclohexene oxide, propylene oxide, methyl glycidyl ether, ethyl glycidyl ether, phenyl glycidyl ether, allyl glycidyl ether, octylene oxide and dodecene oxide.

The epoxy resin used is not necessarily limited to just one type, the concomitant use of two or more epoxy resins being possible.

Illustrative examples of amino group-containing compounds include amine compounds such as diethylene triamine, triethylene tetraamine, diethylaminopropylamine, N-aminoethylpiperazine, bis(4-amino-3-methylcyclohexyl) methane, m-xylylenediamine, methane diamine, 3,9-bis(3-aminopropyl)-2,4,8,10-tetraoxaspiro[5.5]undecane; modified aliphatic polyamines such as epoxy resin-diethylene triamine adducts, amine-ethylene oxide adducts and cyanoethylated polyamines; and 4,4'-diaminodiphenylmethane, o-, m- and p-phenylenediamine, bis[4-(3-aminophenoxy) phenyl]sulfone, 2,4-diaminotoluene, 2,5-diaminotoluene, 2,4-diaminoxylene, 3,6-diaminodurene, 2,2'-dimethyl-4,4'-diaminobiphenyl, 2,2'-dialkyl-4,4'-diaminobiphenyl, 2,2'-dimethoxy-4,4'-diaminobiphenyl, 2,2'-diethoxy-4,4'-diaminobiphenyl, 4,4'-diaminodiphenyl ether, 3,4'-diaminodiphenyl ether, 4,4'-diaminodiphenylsulfone, 3,3'-diaminodiphenylsulfone, 4,4'-diaminobenzophenone, 3,3'-diaminobenzophenone, 1,3-bis(3-aminophenoxy)benzene, 1,3-bis(4-aminophenoxy)benzene, 1,4-bis(4-aminophenoxy)benzene, 4,4'-bis(4-aminophenoxy)biphenyl, bis[4-(4-aminophenoxy) phenyl]sulfone, 2,2-bis[4-(4-aminophenoxy)phenyl] propane, 2,2-bis[4-(4-aminophenoxy)phenyl] hexafluoropropane, 2,2-bis[4-(3-aminophenoxy)phenyl] propane, 2,2-bis[4-(3-aminophenoxy)phenyl] hexafluoropropane, 2,2-bis[4-(4-amino-2-trifluoromethylphenoxy)phenyl]hexafluoropropane, 2,2-bis [4-(3-amino-5-trifluoromethylphenoxy)phenyl] hexafluoropropane, 2,2-bis(4-aminophenyl) hexafluoropropane, 2,2-bis(3-aminophenyl) hexafluoropropane, 2,2-bis(3-amino-4-hydroxyphenyl) hexafluoropropane, 2,2-bis(3-amino-4-methylphenyl) hexafluoropropane, 4,4'-bis(4-aminophenoxy) octafluorobiphenyl, 2,2'-bis(trifluoromethyl)-4,4'-diaminobiphenyl, 3,5-diaminobenzotrifluoride, 2,5-diaminobenzotrifluoride, 3,3'-bis(trifluoromethyl)-4,4'-diaminobiphenyl, 3,3'-bis(trifluoromethyl)-5,5'-diaminobiphenyl, 4,4'-bis(4-aminotetrafluorophenoxy) tetrafluorobenzene, 4,4'-bis(4-aminotetrafluorophenoxy) octafluorobiphenyl, 4,4'-diaminobinaphthyl and 4,4'-diaminobenzanilide.

Examples of phenol group-containing compounds include bisphenol A, bisphenol F, trimethylolallyloxyphenol, phenolic novolac resins having a low degree of polymerization, epoxidized or butylated phenolic resins, and phenolic resins known by such trade names as "Super Beckcite" 1001 (from Japan Reichhold Chemicals Inc.), "Hitanol" 4010 (Hitachi Corporation), Scado form L. 9 (Scado Zwoll, of The Netherlands), and Methylon 75108 (General Electric, of the U.S.A.).

Especially preferred examples include B-1 to B-7 shown in the subsequently described Working Examples.

In this invention, referring to the solubility parameters of the organopolysiloxane (A) and the non-silicone type organic compound (B) as respectively SP(A) and SP(B), SP(B)>SP(A) and SP(B)−SP(A)>2, preferably SP(B)−SP(A)≥2.5, and more preferably SP(B)−SP(A)≥3.

SP(A) is preferably from 7 to 9, and more preferably from 7.5 to 8.5, and SP(B) is preferably from 10 to 16, and more preferably from 11 to 15.

Component (B), which is included in an amount of from 10 to 80 parts by weight, and preferably from 20 to 70 parts by weight, is used in such a way that the combined amount of component (B) together with above component (A) is 100 parts by weight.

In this specification, "SP" refers to the solubility parameter δ calculated by formula (3) below using the ΔF and Δv values for various atomic groups shown in Table 1 below according to T. Okitsu: *Setchaku* (published by Kobunshi Kankokai), Vol. 40, No. 8, pp. 342-350 (1996). In the case of mixed solvents and copolymers, "SP" refers to the solubility parameter δ calculated from formula (4) below.

$$\delta = \Sigma \Delta F / \Sigma \Delta v \quad (3)$$

$$\delta_{mix} = \phi_1 \delta_1 + \phi_2 \delta_2 + \ldots \phi_n \delta_n \quad (4)$$

Here, ΔF represents the ΔF in Table 1 below, and Δv represents the molar volume Δv in Table 1. The symbol φ represents the volume fraction or the molar fraction, with $\phi_1 + \phi_2 + \ldots \phi_n = 1$.

TABLE 1

| Groups | Okitsu's ΔF | Okitsu's Δv |
|---|---|---|
| —CH₃ | 205 | 31.8 |
| —CH₂— | 132 | 16.5 |
| >CH— | 28.6 | −1.0 |
| >CH— (Poly) | 28.6 | 1.9 |
| >C< | −81 | 14.8 |
| >C< (Poly) | −81 | 19.2 |
| CH₂═ | 195 | 31.0 |
| —CH═ | 116 | 13.7 |
| >C═ | 24.2 | −2.4 |
| ═C═ | 200 | 25.0 |
| —C≡ | 100 | 6.5 |
| —O— | 120 | 5.1 |
| —O— (Arom, Lin) | 70 | 3.8 |
| —O— (Epoxy) | 176 | 5.1 |
| —CO— | 286 | 10.0 |
| —COOH | 373 | 24.4 |
| —COOH (Arom) | 242 | 24.4 |
| —COO— | 353 | 19.6 |
| —COO— (Poly) | 330 | 22.0 |
| —O—CO—O— | 526 | 20.0 |
| —CHO | 370 | 25.0 |
| —CHO (Arom) | 213 | 29.0 |
| —OH (Mono) | 395 | 10.0 |
| —OH (Ether) | 342 | 12.0 |
| —OH (H₂O) | 342 | 12.0 |
| —OH (Poly) | 282 | 17.0 |
| —OH (Diol) | 270 | 12.0 |
| —OH (Arom) | 238 | 12.0 |
| —NH₂ | 273 | 16.5 |
| —NH₂ (Arom) | 238 | 21.0 |
| —NH— | 180 | 8.5 |
| —NH— (Link) | 180 | 4.0 |
| —N< | 61.0 | −9.0 |
| —N═ | 118 | 5.0 |
| —N═ (Link) | 118 | 15.0 |
| —CN | 420 | 23.0 |
| —CN (Arom) | 252 | 27.0 |
| —CN (Poly) | 420 | 27.0 |
| —NO₂ | 481 | 24.0 |
| —NO₂ (Arom) | 342 | 32.0 |

TABLE 1-continued

| Groups | Okitsu's ΔF | Okitsu's Δv |
|---|---|---|
| —NCO | 498 | 35.0 |
| —NHCO— | 690 | 18.5 |
| >NHCO— | 441 | 5.4 |
| —CL (Mono) | 330 | 23.0 |
| —CL (Di) | 250 | 25.0 |
| —CL (Tri, Tetra) | 235 | 27.0 |
| —CL (Arom) | 235 | 27.0 |
| —CL (>C<) | 235 | 28.0 |
| —CL (Poly) | 270 | 27.0 |
| —Br (mean) | 302 | 30.0 |
| —F (mean) | 130 | 19.0 |
| —F (Poly) | 110 | 21.0 |
| —SH | 310 | 28.0 |
| >SO₂ | 675 | 11.4 |
| >S═O | 485 | 11.4 |
| —S— | 201 | 12.0 |
| S═ | 201 | 23.0 |
| SO₃ | 322 | 27.5 |
| SO₄ | 465 | 31.8 |
| >Si< | 16.3 | 0 |
| PO₄ | 374 | 28.0 |
| H | 81 | 8.0 |
| —C₆H₅ (Arom) | 731 | 72.0 |
| —C₆H₄ (Arom) | 655 | 62.0 |
| —C₆H₃ (Arom) | 550 | 39.0 |
| —C₆H₂ (Arom) | 450 | 27.0 |
| —C₆H₅ (Poly) | 731 | 79.0 |
| —C₆H₄ (Poly) | 655 | 69.0 |
| —C₆H₃ (Poly) | 550 | 47.0 |
| —C₆H₂ (Poly) | 450 | 32.0 |
| — (Cyclohexyl) | 790 | 97.5 |
| (Plus onto upper groups) | | |
| 3 Member 1 in | +110 | +18 |
| 4 Member 1 in | +110 | +18 |
| 5 Member 1 in | +110 | +16 |
| 6 Member 1 in | +100 | +16 |
| Conjugated | +30 | −22 |
| Double bond | +30 | −10 |
| Ditto (Link) | | |

Note:
(Poly) = Polymer;
(Arom) = Aromatic;
(Lin) = Link

For example, the SP for heptane as a solvent is determined as follows.

Heptane has, as atomic groups: two —CH₃ groups and five —CH₂— groups. Calculating the ΔF and Δv values for the respective groups from Table 1, we get:

$$\Sigma \Delta F = 205 \times 2 + 132 \times 5 = 1{,}070$$

$$\Sigma \Delta v = 31.8 \times 2 + 16.5 \times 5 = 146.1$$

Therefore, from formula (3) above, $\delta_{hep}$ for heptane can be calculated as follows.

$$\delta_{hep} = \Sigma \Delta F / \Sigma \Delta v = 1{,}070 / 146.1 = 7.32$$

Similarly, the bifunctional epoxy resin GAN (Nippon Kayaku Co., Ltd.) has, as atomic groups: four —CH₂— groups, two >CH— groups, two —O— (Arom, Lin) groups, two —O— (Epoxy) groups, one —N<group, and one —C₆H₅ (Arom) group. Determining the ΔF and Δv values for each group from Table 1, we get:

$$\Sigma \Delta F = 1{,}869.2$$

$$\Sigma \Delta v = 145$$

Therefore, from formula (3) above, $\delta_{GAN}$ for the bifunctional epoxy resin GAN (Nippon Kayaku Co., Ltd.) can be calculated as follows.

$$\delta_{GAN} = d \cdot \Sigma \Delta F / \Sigma \Delta v = 1.15 \cdot 1{,}869.2 / 145 = 14.8$$

[Chemical Formula 5]

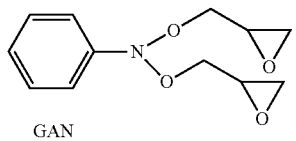

GAN

For example, the SP for liquid bisphenol A epoxy as the polymer is determined as follows.

The liquid epoxy resin used here is RE310S (Nippon Kayaku Co., Ltd.).

From the measured epoxy equivalent weight, the average polymerization number n was set at 0.069.

A specific gravity of 1.15 was used.

For the side left of the repeating unit within parentheses: $\Sigma\Delta F=538.6$, $\Sigma\Delta v=40.9$ For the repeating unit within parentheses: $\Sigma\Delta F=2,352.9$, $\Sigma\Delta v=280.3$ For the side right of the repeating unit within parentheses: $\Sigma\Delta F=2,176.9$, $\Sigma\Delta v=243.3$ Therefore, from above formula (3), the $\delta_{RE310S}$ for the bisphenol A epoxy RE310 can be calculated as follows.

$$\delta_{RE310S}=1.15*(538.6/40.9+0.069*2,352.9/280.3+2,176.9/243.3)=10.9$$

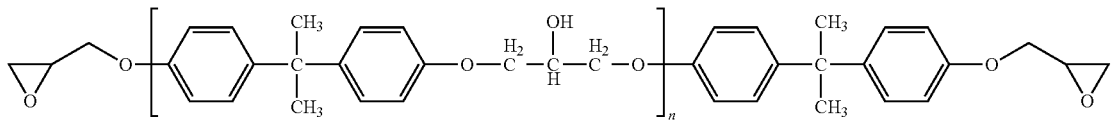

[Chemical Formula 6]

According to *Rika Nenpy*δ, Vol. 84, 54(410), the thermal conductivity of silicone is 0.16 W/mK and the thermal conductivity of epoxy resin (bisphenol A) is 0.21 W/mK.

When the polyorganosiloxane and the non-silicone type organic compound are mixed together, if the difference in their solubility parameters is larger than 2, the two will separate. Owing to the influence of oxygen and moisture in the air, hydroxyl groups or amino groups are present on the surface of metal, metal oxide or metal nitride. Due to these surface functional groups, the non-silicone type organic material having a high SP strongly interacts with the thermally conductive inorganic filler. By intentionally using a non-silicone type organic material having a different and higher SP to carry out bridging between islands of thermally conductive inorganic filler floating in a silicone matrix, heat-dissipating properties lacking in conventional silicone-based thermally conductive thermal greases are exhibited.

Moreover, by imparting thermosetting properties to the non-silicone type organic material, even when the grease has slumped and deformed and even in a low-temperature or high-temperature environment, the heat paths of the thermally conductive inorganic filler and the non-silicone type organic material are retained, and so it can be expected that no change will occur in the thermal conductivity.

Component (C) is a filler which imparts thermal conductivity to the thermally conductive silicone grease composition of the invention.

It is critical for the thermally conductive inorganic filler (C) used in this invention to have an average particle size of from 0.5 to 100 μm. At an average particle size smaller than 0.5 μm or larger than 100 μm, the grease becomes non-uniform and has a high viscosity. Hence, an average particle size of from 1 to 20 μm is especially preferred. In this invention, the average particle size is measured by the laser diffraction method.

The thermally conductive inorganic filler serving as component (C) is exemplified by metallic powders, metal oxide powders, metal hydroxide powders and metal nitride powders. Illustrative examples include aluminum, silver, copper, nickel, zinc oxide, aluminum oxide, silicon oxide, magnesium oxide, aluminum nitride, boron nitride, silicon nitride, metallic silicon and combinations of two or more of these.

The content of component (C) per 100 parts by weight of the organopolysiloxane of component (A) and the non-silicone type organic compound of component (B) combined must be in the range of 200 to 2,000 parts by weight, and is preferably in the range of 700 to 1,500 parts by weight. At less than 200 parts by weight, a sufficient thermal conductivity cannot be obtained, in addition to which the composition does not retain strength as a grease and tends to slump. On the other hand, at more than 2,000 parts by weight, the composition cannot maintain a grease-like state.

When producing the thermally conductive silicone grease composition of the invention, components (A), (B) and (C) and any other ingredients are added and mixed together using a mixing apparatus such as the Trimix, Twinmix or Planetary Mixer (all registered trademarks for mixers manufactured by Inoue Mfg. Inc.), the Ultra Mixer (a registered trademark for mixers manufactured by Mizuho Industrial Co., Ltd.), or the HIVIS DISPER MIX (a registered trademark for mixers manufactured by Tokushu Kika Kogyo K.K.). Heating at between 50° C. and 170° C. may be optionally carried out.

In this invention, the grease viscosity (viscosity of the thermally conductive silicone grease composition) at 25° C. is from 50 to 1,000 Pa·s, and preferably from 100 to 500 Pa·s.

The viscosity is obtained by measuring the viscosity of a sample with a Malcolm viscometer. The maximum value recorded on a plotter is treated as the viscosity.

Rotor: A (10 rpm)

Measurement conditions: 25±0.5° C.

When the viscosity is too low, considerable settling of the filler occurs, making it necessary to mix and stir the composition prior to use. When the viscosity is too high, precise discharge is difficult.

EXAMPLES

The invention is illustrated more concretely below by way of Working Examples and Comparative Examples, although the invention is not limited by these Examples. Tests relating to the Working Examples and Comparative Examples were carried out as follows in order to more clearly demonstrate the superiority of the invention.

[Viscosity of Organopolysiloxane and Non-Silicone Type Organic Compound]

Measurement was carried out with a Brookfield rotational viscometer at 25±0.5° C., using a No. 4 rotor and at a speed of 10 rpm.

[Viscosity of Grease]

The viscosity of the thermally conductive silicone grease composition was measured at 25° C. using the model PC-1TL viscometer (at a speed of 10 rpm) from Malcolm Co., Ltd.

[Thermal Conductivity]

The thermal conductivity was measured at 25° C. using the TPA-501 from Kyoto Electronics Manufacturing Co., Ltd.

Working Examples, Comparative Examples

Thermally conductive silicone grease compositions were obtained by mixing together the compounding ingredients shown in Tables 2 and 3, in the amounts there indicated, for 2 hours at 150° C. in a planetary mixer. Grease viscosity and thermal conductivity results for the resulting compositions are shown in Tables 2 and 3.

Components (A) to (C) in the table were as follows.
Organopolysiloxane (A)
A-1: An organopolysiloxane (SP, 8.0; viscosity, 30 mPa·s)

[Chemical Formula 7]

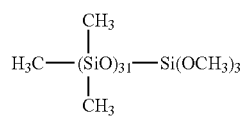

A-2: An organosilane (SP, 8.2; viscosity, 3 mPa·s)

[Chemical Formula 8]

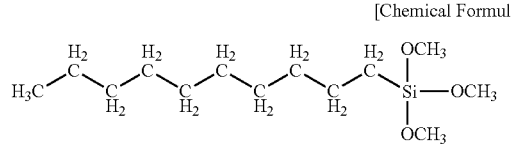

A-3: An organopolysiloxane (SP, 8.1; viscosity, 80 mPa·s)

[Chemical Formula 9]

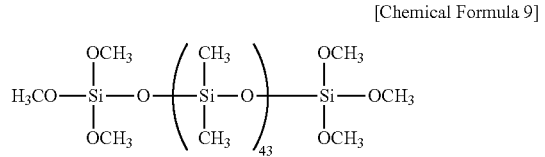

Non-Silicone Type Organic Compound (B)
B-1: A bisphenol A type epoxy resin (SP, 10.9; viscosity, 16,000 mPa·s)

[Chemical Formula 10]

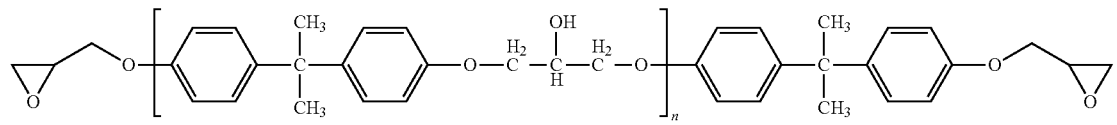

B-2: A bisphenol F type epoxy resin (SP, 12.7; viscosity, 1,300 mPa·s)

[Chemical Formula 11]

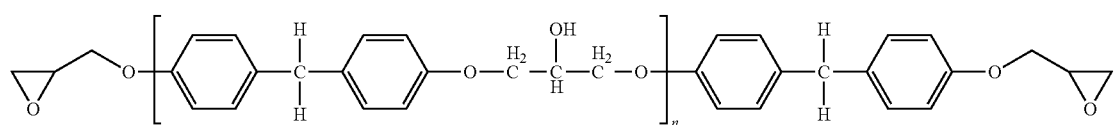

B-3: Epicoat 630 (SP, 14.6; viscosity, 250 mPa·s)

[Chemical Formula 12]

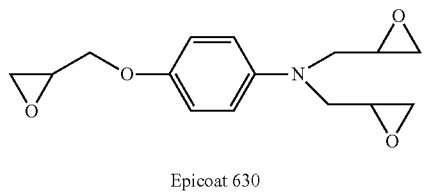

Epicoat 630

B-4: GAN (SP, 14.5; viscosity, 130 mPa·s)

[Chemical Formula 13]

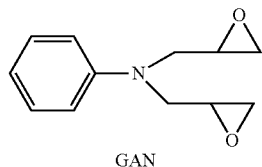

GAN

B-5: GOT (SP, 12.9; viscosity, 55 mPa·s)

[Chemical Formula 14]

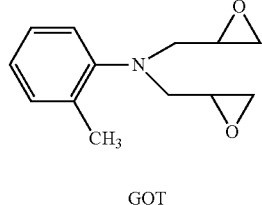

GOT

B-6: Diaminodimethyldiphenylmethane (SP, 11.8; viscosity, 1,500 mPa·s)

[Chemical Formula 15]

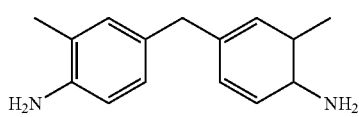

B-7: Dihydroxydiallyldiphenylmethane (SP, 12.9; viscosity, 2,500 mPa·s)

[Chemical Formula 16]

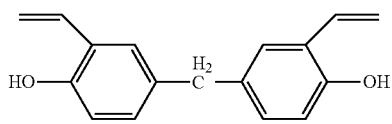

Thermally Conductive Inorganic Filler (C)
C-1: Zinc oxide powder (average particle size, 1.1 μm)
C-2: Aluminum powder (average particle size, 10 μm)

Dicyandiamide (DICY) was used as the catalyst for epoxy homopolymerization, epoxy-amine polymerization and epoxy-phenol polymerization.

[Organopolysiloxane: Siloxane (1)]

A flask having a capacity of 100 mL and equipped with a stirrer, a thermometer, a condenser and a nitrogen gas inlet was charged with: 39 g of an organopolysiloxane that was capped at both ends with dimethylvinylsilyl groups, had a main chain composed of 5 mol % of phenyl group with the balance (95 mol %) being methyl groups, and had a viscosity at 25° C., as measured with a No. 4 rotor at 10 rpm, of 1,100 mPa·s; and 1 g of an organohydrogenpolysiloxane of the formula below. Next, 0.03 g of a dimethylvinylsilyl end-capped dimethylpolysiloxane solution of a platinum-divinyltetramethyldisiloxane complex (platinum catalyst containing 1 wt % of platinum atoms) was also added, giving an organopolysiloxane (Siloxane (1)). The solubility parameter was 8.1.

[Chemical Formula 17]

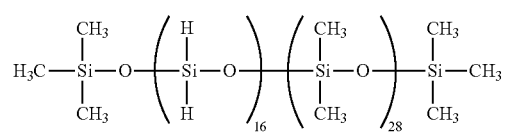

The particle size of the thermally conductive inorganic filler was the volume-base cumulative average size measured with the Microtrac MT-3300EX particle size analyzer (Nikkiso Co., Ltd.).

The results in Tables 2 and 3 demonstrate that the thermally conductive silicone grease compositions of this invention not only have a high thermal conductivity; because of their low viscosity, they also have an excellent productivity.

TABLE 2

| Composition (pbw) | | Working Example | | | | | | | | | |
|---|---|---|---|---|---|---|---|---|---|---|---|
| | | 1 | 2 | 3 | 4 | 5 | 6 | 7 | 8 | 9 | 10 |
| Formulation | A-1 | 60 | | 60 | 60 | 60 | 60 | 60 | 60 | 50 | 80 |
| | A-2 | | | | | | | | | | |
| | A-3 | | 60 | | | | | | | | |
| | B-1 | 38 | 38 | | | | | | 28 | 22 | 47 | 20 |
| | B-2 | | | 38 | | | | | | | |
| | B-3 | | | | 38 | | | | | | |
| | B-4 | | | | | 38 | | | | | |
| | B-5 | | | | | | 38 | | | | |
| | B-6 | | | | | | | 10 | | | |
| | B-7 | | | | | | | | 16 | | |
| | C-1 | 160 | 160 | 160 | 160 | 160 | 160 | 160 | 160 | 160 | 160 |
| | C-2 | 800 | 800 | 800 | 800 | 800 | 800 | 800 | 800 | 800 | 800 |
| | DICY | 2 | 2 | 2 | 2 | 2 | 2 | 2 | 2 | 3 | 1 |
| Grease viscosity (Pa·s) at 10 rpm | | 440 | 650 | 180 | 200 | 150 | 80 | 700 | 800 | 660 | 350 |
| Thermal conductivity (W/mK) | | 6.6 | 6.7 | 6.7 | 7.4 | 7.1 | 7.0 | 5.8 | 6.1 | 7.0 | 5.3 |

TABLE 3

| Composition (pbw) | | Comparative Example | | | | | | |
|---|---|---|---|---|---|---|---|---|
| | | 1 | 2 | 3 | 4 | 5 | 6 | 7 |
| Formulation | Siloxane (1) | 40 | 40 | | | | | |
| | A-1 | 60 | 60 | 95 | 10 | 95 | 10 | |
| | A-2 | | | | | | | 60 |
| | B-1 | | | 4.8 | 86 | | | 38 |
| | B-2 | | | | | | | |
| | B-3 | | | | | 5 | 90 | |
| | C-1 | 160 | 240 | 160 | 160 | 160 | 160 | 160 |
| | C-2 | 800 | 1,200 | 800 | 800 | 800 | 800 | 800 |
| | DICY | | | 0.2 | 4 | | | 2 |
| Grease viscosity (Pa·s) at 10 rpm | | 60 | 1,000> | 5 | 1,000> | 5 | 1,000> | 400 |
| Thermal conductivity (W/mK) | | 4.9 | 7.4 | 4.9 | N.A. | 4.9 | N.A. | 4.9 |

INDUSTRIAL APPLICABILITY

The thermally conductive silicone grease compositions of the invention not only have a high thermal conductivity, they also have a low viscosity and are thus easy to work with. These qualities make them suitable for removing heat from electrical and electronic components that generate heat during use.

The invention claimed is:

1. A thermally conductive silicone grease composition comprising
   (A) from 20 to 90 parts by weight of an organopolysiloxane,
   (B) from 80 to 10 parts by weight of a non-silicone organic compound which is an aromatic liquid compound with a functionality of 3 or less that has on the molecule an organic group selected from among epoxy, phenolic hydroxyl and amino groups, the combined amount of components (A) and (B) being 100 parts by weight, and
   (C) a thermally conductive inorganic filler having an average particle size of from 0.5 to 100 μm, in an amount of from 200 to 2,000 parts by weight per 100 parts by weight of components (A) and (B) combined,
wherein the non-silicone organic compound (B) and the organopolysiloxane (A) have respective solubility parameters (SP) such that
   the SP of component (B) >the SP of component (A), and the SP of component (B)−the SP of component (A) >2; and
the thermally conductive silicone grease composition has a viscosity at 25° C. of from 50 to 1,000 Pa·s.

2. The thermally conductive silicone grease composition of claim 1, wherein the organopolysiloxane (A) is a hydrolyzable organopolysiloxane of general formula (1) below which has a viscosity at 25° C. of from 0.005 to 100 mPa·s

[Chemical Formula 1]

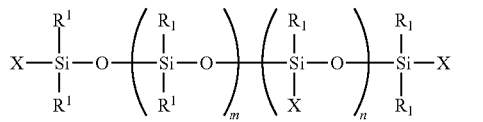

(1)

wherein each $R^1$ is a like or unlike monovalent hydrocarbon group, each X is $R^1$ or a group of the formula $—R^2—SiR^1_{(3-a)}(OR^3)_a$ wherein $R^1$ being as defined above; $R^2$ being an oxygen atom or an alkylene group of 1 to 4 carbon atoms; $R^3$ being an alkyl, alkoxyalkyl, alkenyl or acyl group of 1 to 4 carbon atoms; and the letter "a" being an integer from 1 to 3, and m and n respectively satisfy the conditions $1 \leq m \leq 1,000$ and $0 \leq n \leq 1,000$;

the non-silicone organic compound (B) is a compound with a solubility parameter of 10 or more which has on the molecule an organic group selected from among epoxy, phenolic hydroxyl and amino groups; and the thermally conductive inorganic filler (C) is of at least one selected from the group consisting of metallic powders, metal oxide powders, metal hydroxide powders and metal nitride powders.

3. The thermally conductive silicone grease composition of claim 2, wherein the organopolysiloxane (A) is a hydrolyzable organopolysiloxane having three or six $OR^3$ groups (wherein $R^3$ is as defined above).

4. The thermally conductive silicone grease composition of claim 2, wherein the non-silicone organic compound (B) is an aromatic liquid epoxy resin having a functionality of 3 or less.

5. The thermally conductive silicone grease composition of claim 1, wherein the thermally conductive inorganic filler (C) is one or a combination of two or more selected from the group consisting of aluminum, silver, copper, nickel, zinc oxide, aluminum oxide, silicon oxide, magnesium oxide, aluminum nitride, boron nitride, silicon nitride and metallic silicon.

6. The thermally conductive silicone grease composition of claim 1, wherein the non silicone organic compound (B) is selected from the group consisting of bisphenol A type liquid epoxy resins, bisphenol F type liquid epoxy resins, 4-(2,3-epoxypropoxy)-N,N-glycidylaniline, N,N-diglycidylaniline, N,N-diglycidyltoluidine, 4,4'-diamino-3,3'-dimethyldiphenylmethane, and 4,4'-dihydroxy-3,3'-diallyldiphenylmethane.

* * * * *